United States Patent [19]

Bonacci

[11] Patent Number: 5,335,882
[45] Date of Patent: Aug. 9, 1994

[54] COMBINATION SEAT CUSHION AND LIFE VEST PARTICULARLY ADAPTED TO AN AIRCRAFT CHAIR

[76] Inventor: Frank Bonacci, 5 Second St., Holbrook, N.Y. 11741

[21] Appl. No.: 59,105

[22] Filed: May 10, 1993

[51] Int. Cl.⁵ .................. B64D 11/06; B64D 25/04
[52] U.S. Cl. .................. 244/118.5; 244/122 R; 441/126; 441/116; 297/452.48; 297/463
[58] Field of Search .................. 244/118.5, 141; 441/125, 126, 111, 113, 116; 297/452.1, 452.48, 463

[56] References Cited

U.S. PATENT DOCUMENTS

| | | | |
|---|---|---|---|
| 3,167,794 | 2/1965 | Brown | 441/127 |
| 4,472,151 | 9/1984 | Hoffman | 441/116 |
| 4,619,623 | 10/1986 | Elverskog | 441/125 |

Primary Examiner—Michael S. Huppert
Assistant Examiner—Anne E. Bidwell
Attorney, Agent, or Firm—Galgano & Burke

[57] ABSTRACT

A combination seat cushion and life vest particularly adapted for use as an aircraft chair includes a generally rectangular buoyant main rear panel and a buoyant segmented front panel hingedly joined to the rear panel in substantially covering relationship thereto so as to form, in a closed position thereof, a generally rectangular cushion of generally uniform thickness and, in an open position thereof, an openable and wearable life vest sized and dimensioned to cover the rear side and front side of a user from the shoulder to approximately the waist. The segmented front panel includes a neck cutout slit centrally disposed along and adjacent to its top edge forming a neck flap hingedly joined along a hinge line to the top edge of the rear panel, and a bifurcating vertical slit extending between the bottom edge thereof and terminating at the neck cutout slit so as to divide the segmented front panel into an openable front left flap and an openable front right flap, each flap being hingedly joined along a hinge line to the rear panel and being releasably securable to one another. The front left and right flaps each include an arm cutout slit disposed along the corresponding side lateral edge thereof forming an arm cutout flap hingedly joined to the corresponding side lateral edge of the main panel.

10 Claims, 5 Drawing Sheets

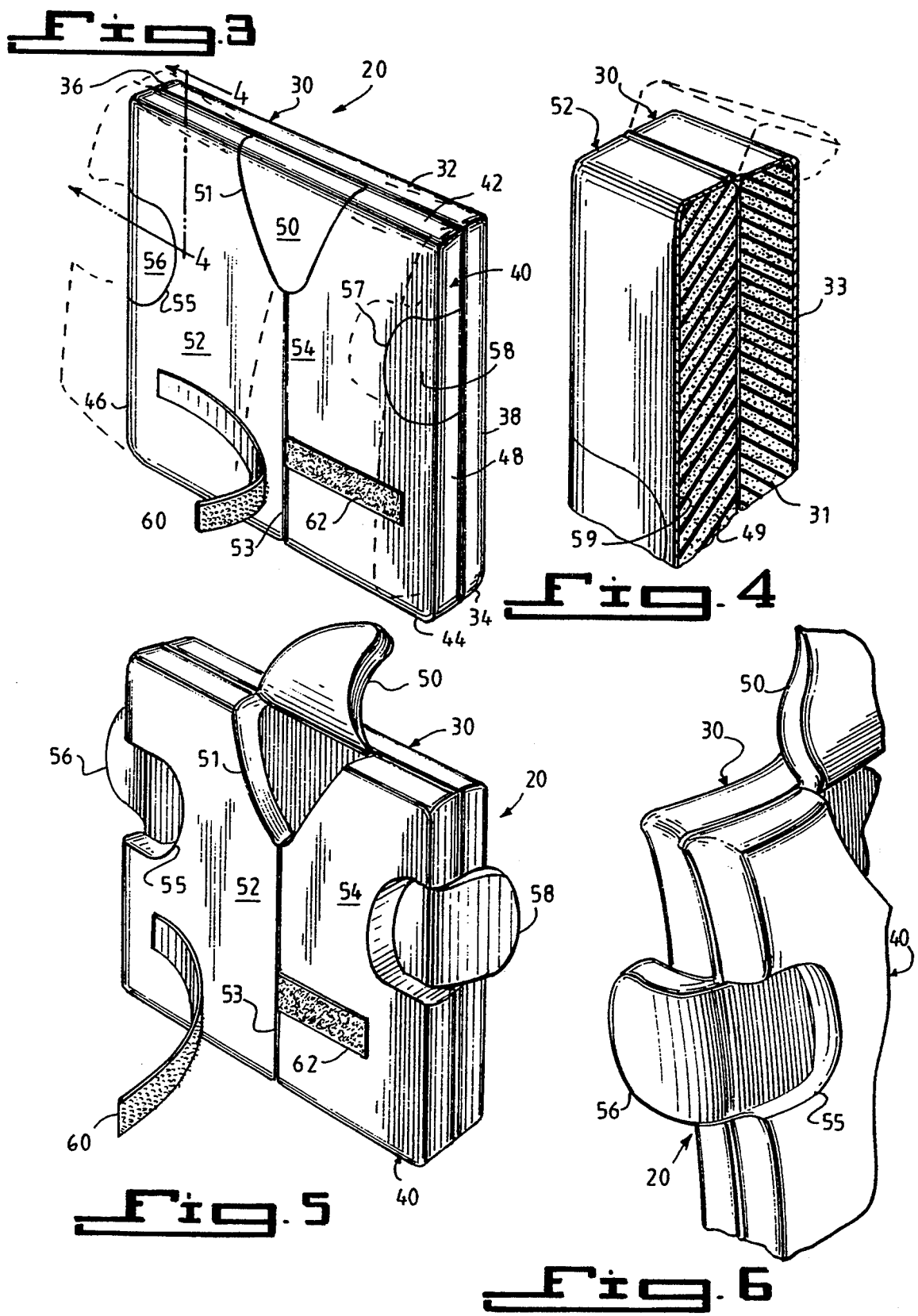

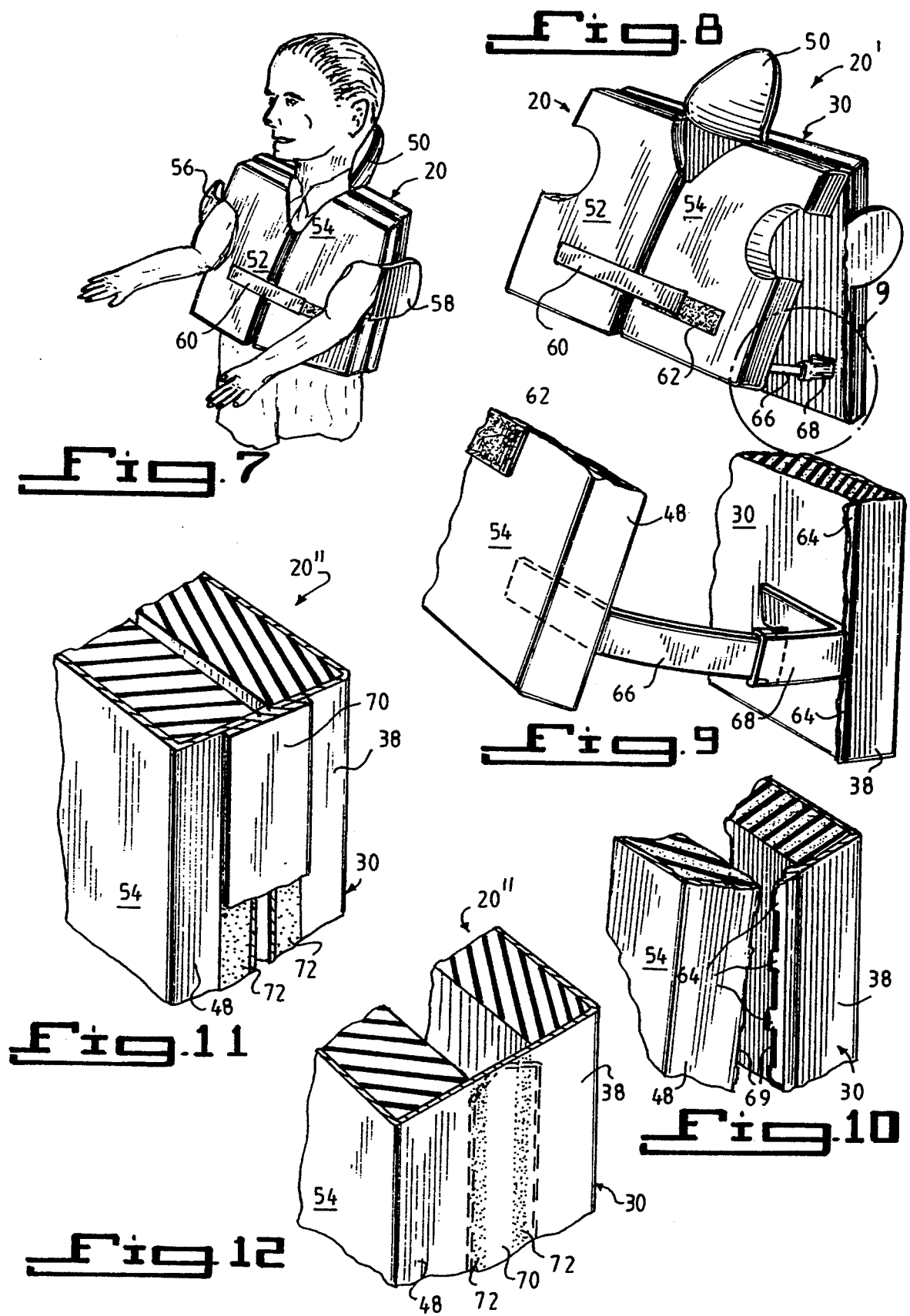

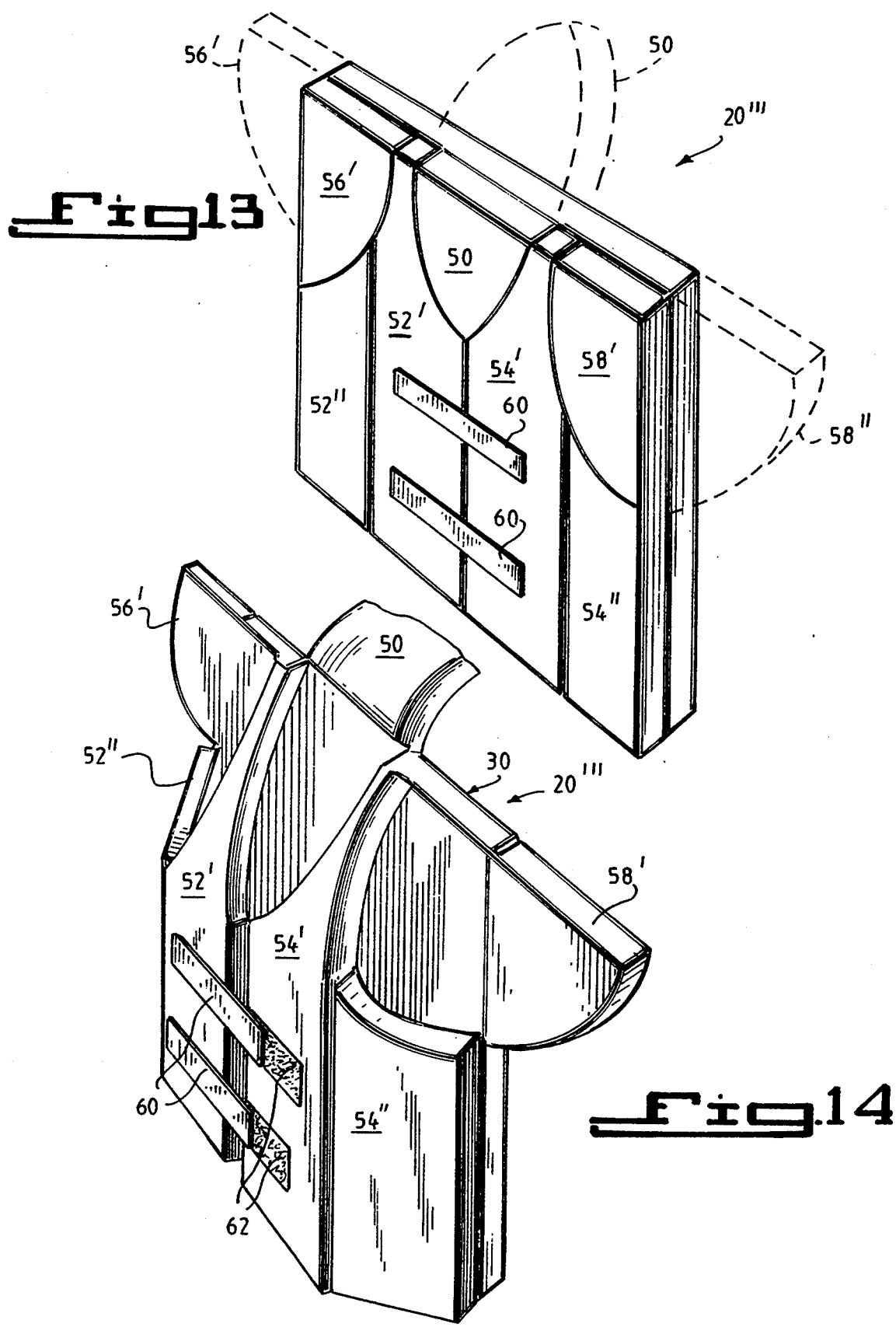

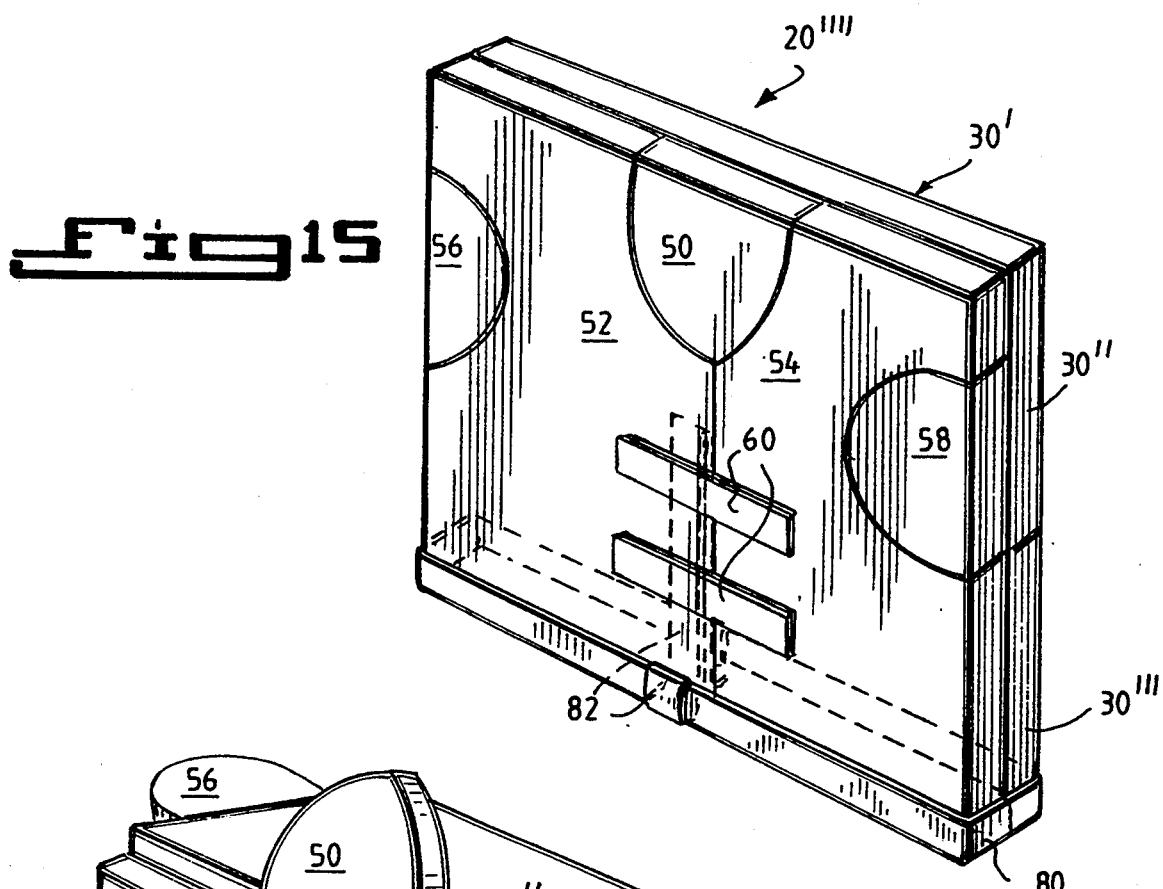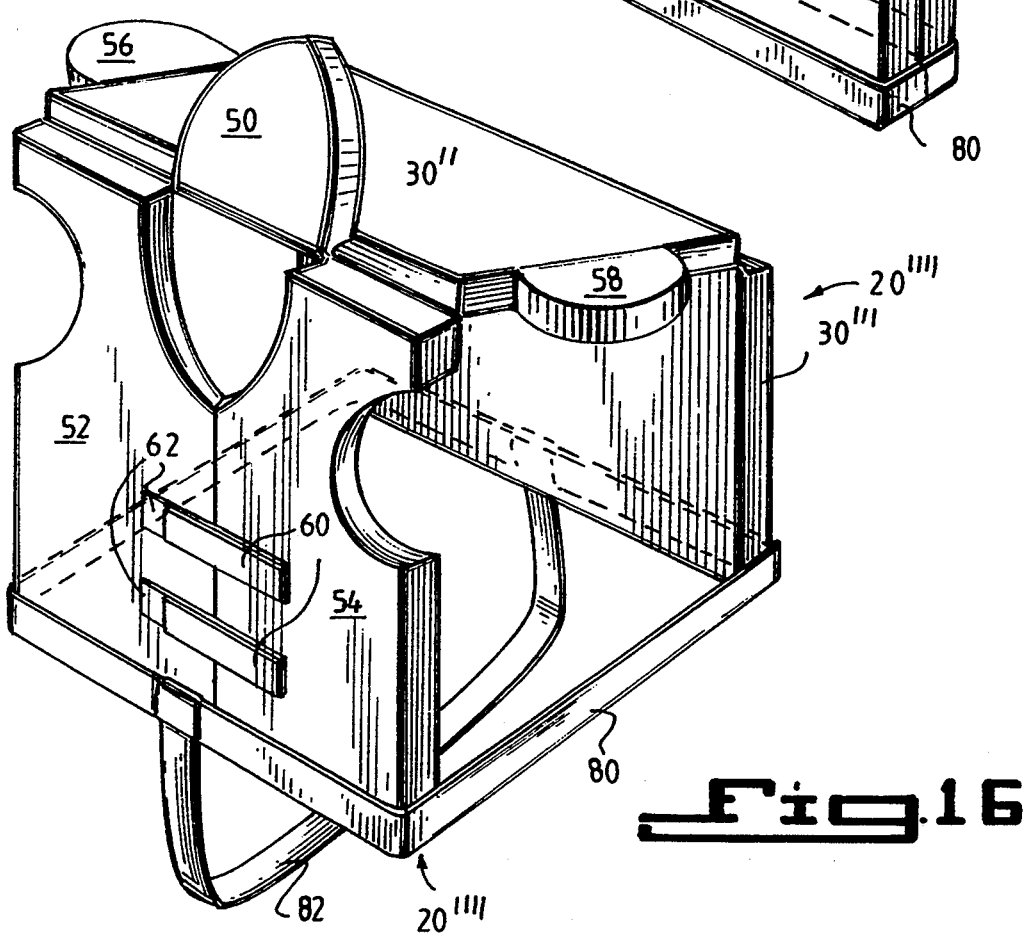

COMBINATION SEAT CUSHION AND LIFE VEST PARTICULARLY ADAPTED TO AN AIRCRAFT CHAIR

BACKGROUND OF THE INVENTION

The present invention relates to a seat cushion which is particularly adapted to an aircraft chair and which in the of an emergency can be worn by a passenger as a life vest.

Federal regulations mandate that aircraft flying over water provided with a life preserver for each passenger. Life preservers, for example floats or sleeveless jackets, of buoyant material or gas filled bladders, provide additional to a passenger who finds himself in water and prolongs the chance of survival of the passenger from drowning. Although the regulations are well intended for the safety of the passengers, the regulations also burden airlines by increasing weight of the aircraft and reducing the available space in the cabin. Typically, current life jackets are stored every passenger seat being easily accessible by the passenger in the event of an emergency.

A number of attempts have been made in combining a seat cushion and life preserver for use on boats and in aircraft since the elastic material of the cushion, be it foam or air, can serve the dual function of the buoyant material of the life preserver. Examples of a seat cushion which also function as a life preserver in the shape of a life belt which wraps around the torso of a person include U.S. Pat. No. 2,310,840 granted to Crabtree, U.S. Pat. No. 2,132,544 granted to Shaw, and U.S. Pat. No. 3,225,369 granted to Barwick.

Examples of combination seat cushion and life preserver straps for attachment to the posterior of a person include U.S. Pat. No. 2,829,386 granted to Peer and U.S. Pat. No. 2,851,706 granted to Patterson.

Another example, U.S. Pat. No. 3,094,723 granted to Manhart, discloses a buoyant cushion device which can be filled with air. The device is generally rectangular in shape having a U-shaped neck cutout configured so that the device can be placed and retained with straps on a person's shoulders.

A further example, more suitable for use in an aircraft, is U.S. Pat. No. 4,619,623 granted to Elverskog, which discloses a life-jacket assembly having a elongate buoyant body with an opening for a passenger's head and straps for retaining the buoyant body to a passenger in the event of an emergency. The life-jacket is generally flat and is to be entirely contained in an upward extending open compartment in the backrest of a chair. Problems with this device are its unorthodox appearance from conventional life preservers and the manner in which it is used. A passenger must properly insert his head in the opening and arms through straps that must be positioned behind the back. If in an emergency situation the device is used backwards or upside down it is ineffective and any additional time used correcting the position the device can mean the difference between life or death.

Thus, there is need for a seat cushion which truly resembles a life vest enabling immediate use by a passenger in the event of an emergency.

SUMMARY OF THE INVENTION

Accordingly, it is an object of the present invention to provide an improved combination seat cushion and life vest, especially intended for aircraft, that is easily accessible by a passenger and quickly recognizable for proper usage by a passenger particularly during the stressful event of an emergency.

It is also an object of the present invention to provide such a combination seat cushion and life vest which affords common sizing for keeping a person afloat in a proper orientation.

It is a further object of the present invention to provide such a combination seat cushion and life vest which serves to increase the available space in an aircraft cabin for items such as carry on luggage and the like, and also minimize the overall weight of the aircraft.

It is another object of the present invention to provide such a combination life vest and seat cushion which is easily and inexpensively manufactured satisfying the needs of the airline industry and the safety of the passengers.

Certain of the foregoing and related objects are readily obtained in a combination seat cushion and life vest embodying the present invention which is particularly adapted for use in an aircraft chair and which includes a generally rectangular buoyant main rear panel and a buoyant segmented front panel hingedly joined to the rear panel in substantially covering relationship thereto so as to form, in a closed position thereof, a generally rectangular cushion of generally uniform thickness and, in an open position thereof, an openable and wearable life vest sized and dimensioned to cover the rear side and front side of a user from the shoulder to approximately the waist. The front and rear panels each having a top edge, a bottom edge and a pair of lateral side edges and the segmented front panel includes a neck cutout slit centrally disposed along and adjacent to the top edge thereof forming a neck flap hingedly joined along a hinge line to the top edge of the rear panel. The front panel also includes a bifurcating vertical slit extending between the bottom edge thereof and terminating at the neck cutout slit so as to divide the segmented front panel into an openable front left flap and an openable front right flap, each flap being hingedly joined along the hinge line to the rear panel. The front left and right flaps each include an arm cutout slit disposed along the corresponding side lateral edge thereof forming an arm cutout flap hingedly joined to the corresponding side lateral edge of the main panel. Means are also provided for releasably securing the openable left and right flaps in a closed relationship.

Preferably, the main rear panel and the segmented front panel further include an outer covering shell and the releasably securing means includes hook and loop fastening elements.

Most advantageously, means are provided for connecting the front left flap and the front right flap to the main rear panel along a corresponding lateral side edge of the main rear panel. Most desirably, the connecting means are a pair of retaining straps. Alternatively, or in addition thereto, the connecting means includes frangible connections between the front left flap and the front right flap and the corresponding lateral side edges of the main rear panel. In a further embodiment, the connecting means includes a releasably adhesively bonded and folded web interconnecting the lateral side edges of the front and rear panels which in a folded and bonded condition maintains the front and rear panels in abutting relationship and in an unfolded condition allows the panels to be spread apart a fixed distance.

In a particularly preferred embodiment of the invention, the front left and right flaps and the upper arm cutout flaps are formed in corners of the front panel defined between the top and side lateral edges thereof and the front left and right flaps are segmented along vertical hinge lines.

In an especially preferred embodiment, the rear panel has a generally centrally disposed horizontal hinge line to define an upper main panel and a lower main panel and additionally includes a pair of releasably restraining straps coupling the lower main panel and the front panel, one of which is intended to fit around the waist of the wearer and the other of which is intended to fit between the legs of the wearer.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

In the drawings, wherein similar reference characters similar elements throughout the several views:

FIG. 3 is a perspective view of the combination seat cushion and life vest showing the segmented front panel in a closed position, and in phantom line, in a slightly open position;

FIG. 4 is an enlarged, partially perspective sectional view taken along line 4—4 of FIG. 3, further showing in phantom line, pivotal movement the rear panel to an open position thereof;

FIG. 5 is a perspective view of the combination seat cushion and life vest with the openings for the head and arms of a passenger in operative positions for use as a life vest;

FIG. 6 is a fragmentarily-illustrated perspective view of a of the combination seat cushion and life vest shown in FIG. 5, with its flaps partially deflected to facilitate use as a life vest;

FIG. 7 is a perspective view of an airline passenger illustrating use of the present invention as a life vest;

FIG. 8 is a perspective view of an alternative embodiment of the combination seat cushion and life vest having a frangible or breakable attachment between the vertical edges of the main panel and front left and right flaps which permit increased expansion therebetween;

FIG. 9 is an enlarged fragmentarily-illustrated perspective view taken within the area defined by circle 9 of FIG. 8, illustrating the details of an expansion restraining strap;

FIG. 10 is an enlarged perspective view of another embodiment of the frangible attachment between the main panel and front left and right flaps;

FIG. 11 is enlarged perspective view of another attachment of the vertical edges of the main panel and front right and left flaps having a foldable strip of material adhesively connected in the closed or collapsed position;

FIG. 12 is an enlarged perspective view of the embodiment of FIG. 11 showing the fully opened position of the main panel and front flap;

FIG. 13 is a perspective view of another embodiment of the combination seat cushion and life vest having enlarged arm cutout flaps and partitioned front left and right flaps, with the flaps in an open position being shown in phantom view;

FIG. 14 is a perspective view of the embodiment of FIG. 13 with the opening for the head and arms in operative positions;

FIG. 15 is a perspective view of still another embodiment of the combination seat cushion and life vest; and FIG. 6 is a perspective view of the embodiment of FIG. 15 showing the fully opened position of the main and front panel.

DETAILED DESCRIPTION OF The PREFERRED EMBODIMENTS

Figure 1:
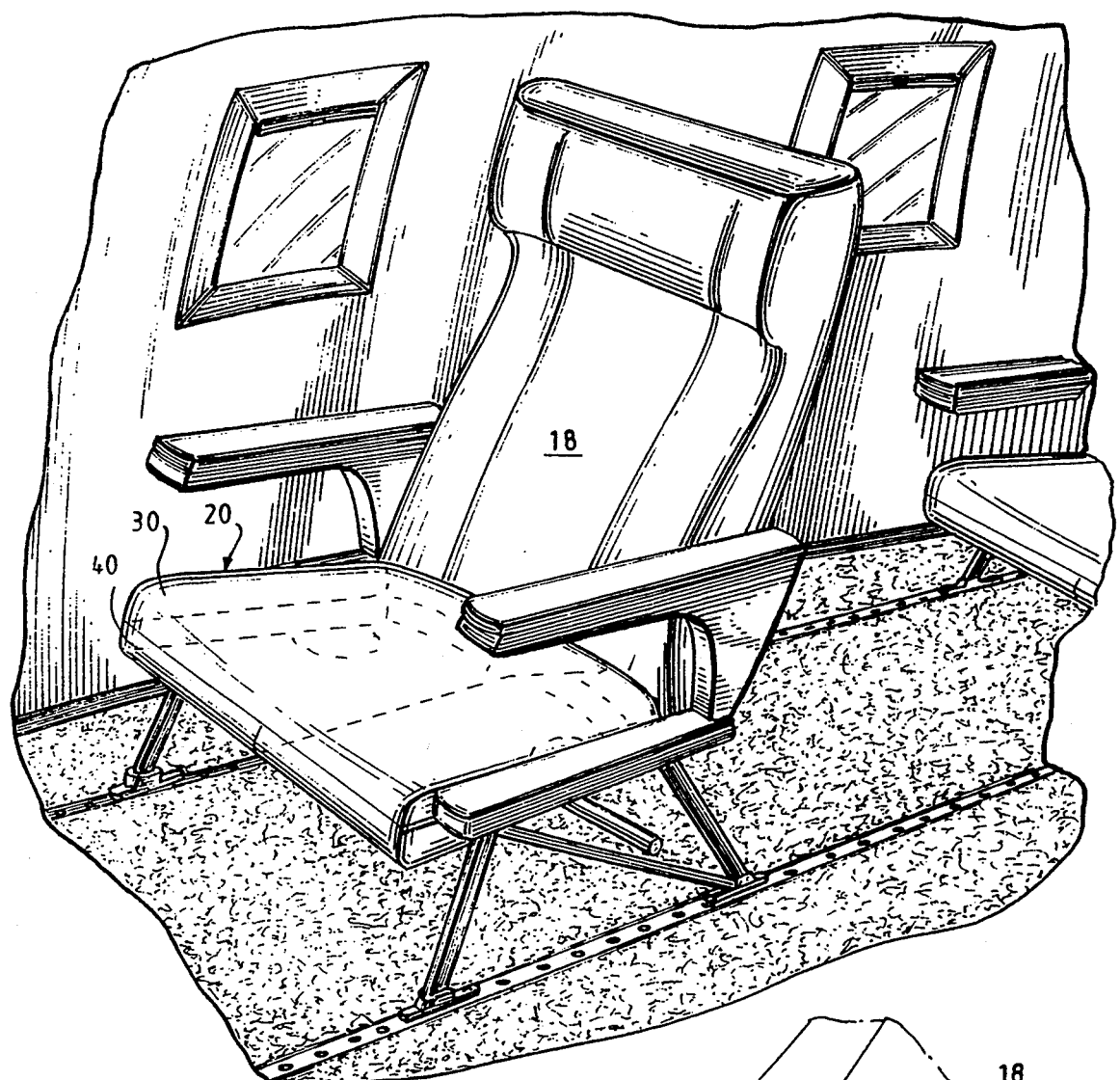
FIG. 1 is a perspective view of a combination seat cushion and fe vest embodying the present invention installed in an aircraft chair.
Figure 2:
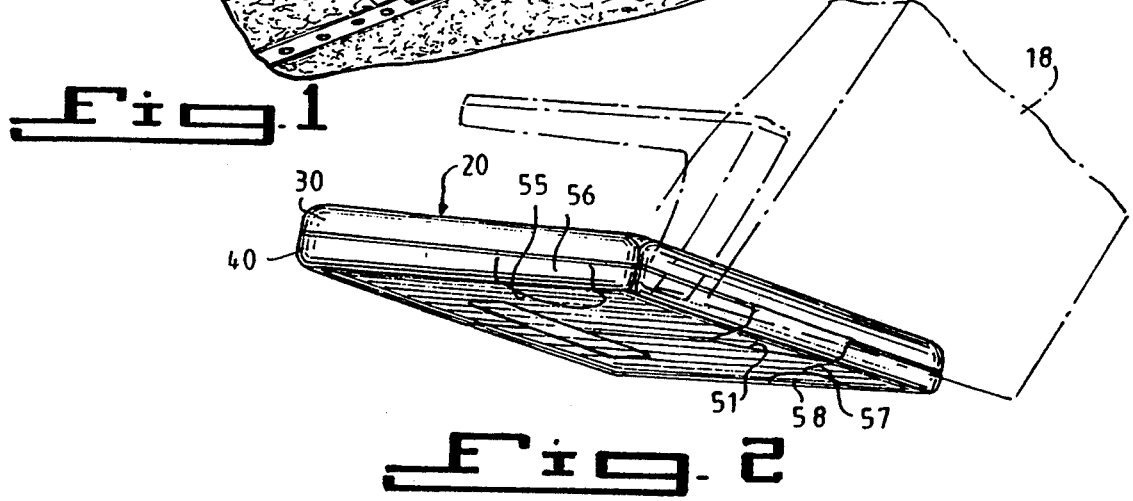
FIG. 2 is a bottom perspective view of the combination seat cushion and life vest installed in an aircraft chair which is shown in phantom.

Turning now in detail to the drawings, and in particular to FIG. 1, therein illustrated is a conventional aircraft chair 18 which is fitted with a combination seat cushion and life vest 20 embodying the present invention which in its compact configuration functions as a cushion and when expanded or opened can be easily worn by a passenger as a life vest. Life vest 20 generally consists of a main rear panel 30 and a hingedly attached corresponding segmented front panel 40 which in its compact or collapsed configuration is substantially of uniform thickness and dimensioned to fit the seat of a convent aircraft chair. An outer surface of main panel 30 is disposed upward upon which a passenger sits and segmented panel 40 is disposed downward hidden from view of the passenger as shown in FIG. 2.

Referring now to FIG. 3, main panel 30 is generally of rectangular shape having a top edge 32, bottom edge 34 and a pair of vertical or lateral side edges 36 and 38. Similarly, segmented front panel 40 has a corresponding upper edge 42, bottom edge 44, an a pair of vertical or lateral side edges 46 and 48. Segmented front panel 40 is easily recognized as forming the front of the life vest and includes a neck cutout flap 50, openable front left flap 52, openable front right flap 54 and a pair of arm cutout flaps 56 and 58. Neck cutout flap 50 as defined by slit 51 is centrally disposed along top edge 42 and is triangular in shape and sized to allow a comfortable fit for the passenger while wearing as a life vest. Openable front left flap 52 and openable front right flap 54 are formed by a bifurcating vertical slit or opening 53 extending between bottom edge 44 and terminating at neck cutout slit 51. Arm cutouts flaps 56 and 58 as defined by slits 55 and 57 are disposed along vertical edges 46 and 48 of front left and front right flaps 52 and 54, respectively, and are shown as semi-circular in shape and appropriately positioned to form arm openings in the life vest 20.

As shown in FIG. 4, main panel 30 is further comprised of an inner buoyant material 31 surrounded by an outer shell 33. Similarly, openable front left flap 52, as well as openable front right flap 54, neck cutout 50 and arm cutouts 56, 58 (not shown) are comprised of an inner buoyant material 49 surrounded by an outer shell 59. Preferably, buoyant material is a foam plastic such as closed cell polyethylene or polyurethane or PVC/PE foam and the surrounding outer shell is formed from a fabric such as cotton, nylon, or other suitable material so that the life vest 20 is comfortable to the passenger when worn as well as sitting down.

Referring now to FIGS. 5 and 6, the top edge positions of the top edge 42 of left and right front flaps 52, 54 and neck cutout flap 50 are hingedly attached to top edge 32 of main panel 30. Likewise, the vertical edge portions of the vertical side edges 46, 48 of left and right front flaps 52 and 54, and arm cutout flaps 56 and 58 are hingedly attached to vertical edges 36 and 38 of main panel 30. Preferably, the outer surrounding cotton or nylon fabric shell is sewn together to hingedly attach the various flaps to main panel 30. When life vest 20 is worn by a passenger neck cutout flap 50 and arm cutout flaps 56, 58 are unfolded or turned outward forming openings as best shown in FIG. 7.

As seen best in FIGS. 3, 5 and 7, front flap opening 53 is held in a closed relationship when collapsed as a cushion and when worn by a passenger by a releasable belt or strap 60 attached to the outer surface of front right and left panels 52, 54. Preferably, releasable belt includes hook and loop fastener material such as the type sold under the trademark VELCRO ®. Specifically, referring to FIG. 3, a strap of hook fasteners 60 are attached to front left flap 52 and extends across for corresponding engagement with loop fasteners 62 on front right flap 54. The releasable belt is a strip of material approximately a size of 1 to 1½ inches in width and 6 to 8 inches in length.

In the event of an emergency the passenger simply lifts or slides combination seat cushion and life vest out from underneath the airline chair 18, releases the VELCRO ® strip, places his arms in the arm cutout openings and his neck through the neck opening as one would a conventional jacket or vest, and reseals the releasable VELCRO ® strip. Life vest 20 when worn extends from the top of the shoulders to approximately the waist of the passenger.

FIGS. 8-10 disclose an additional embodiment of the present invention, which increases the expandability of the vest 20' when worn by a passenger. In this embodiment, the vertical edges of the front left and right flaps 52, 54 are attached to the main panel 30 via frangible or rupturable seams 64, thus permitting the passenger to apply force to separate the along the vertical edges 38, 48 and 36, 46. Life vest 20' can also be provided with a pair of interconnected expansion retaining straps 66, 68 (one of which is shown) which adjustably connects the lower ends of the front flaps 52, 54 to the lower end of main panel 30, but which limits expansion via a mechanical interlock of the strap ends to prevent unintentional removal of the vest. As seen best in FIG. 10, the frangible seam 64 of the vertical edges of the front left and right flaps 52, 54 to the main panel 30 include a plurality of slots 69 along the attachment zone to aid rupture upon use.

Another embodiment of the hinged attachment of the top edges 32, 42 and the sides edges 36, 46 and 38, 48 are shown in FIGS. 11 and 12 which increases the expandability of the main and segmented panels when the life vest is worn about a passenger. Specifically, instead of just the outer fabric shell being sewn together, the hingable top edges and side edges contain a folded strip of material 70 temporarily adhesively secured via adhesive portions 72 when in a closed or compact condition but which easily unfolds for use as an expandable vest 20".

Another alternative embodiment of the present invention is shown in FIGS. 13 and 14 which discloses a more stylized combination seat cushion and life vest which is adaptable to greater size variations of passengers. Life vest 20''' has arm flaps 56', 58' that hingably attach to the main panel solely along their vertical edges. Further, front left and right flaps are partitioned or segmented into hinged segments 52', 52'', 54', 54'' so as to more fully conform around the front or chest of a passenger. In this embodiment, a pair of releasable belts 60, 62 are attached in parallel relationship across the front of the opening flap.

Still another alternative embodiment of the present invention is shown in FIGS. 15 and 16 which is adapted to better conform to a large passenger. Combination seat cushion and life vest 20'''' has a partitioned main pane 30' consisting of an upper panel 30'' which would overlie the wearer's shoulders and a lower panel 30''' hinged thereto which would cover the wearer's back; the lower main panel 30''' is shown to contain buoyant material, it could equally consist of single ply of fabric material.

A waist strap 80 surrounds the lower edge of the front and rear panels 52, 54, 30''' and is secured to their lower edges. The excess strap 80 simply being sandwiched between the front panels 52, 54 and rear main panel 30' when in the collapsed or closed state (FIG. 15). A center strap 82 extending from the bottom edge of the front panel 52 to the lower edge of the lower main panel 30''' further retains the passenger and would especially be useful for small children. This strap 82 could be sewn at its rear end to the lower main panel 30''' and joined to the front panel 52 via a VELCRO ® connection. To convert the cushion to a vest, one simply opens straps 80 and 82 and places the vest on with the flaps 50, 56, 58 open as shown in FIG. 16 and then reattaches straps 80 and 82.

Various modifications can be made as will be apparent to those skilled in the art. For example, although the combination seat cushion and life vest is preferably adapted to the seat of an aircraft chair it can easily be adapted to the chair back-rest. Furthermore, although the combination seat cushion and life vest is ideally suited of use on an airplane, the combination seat cushion and life vest is also well suited for use on boats or cruise ships. In addition although, hook and loop fasteners are preferably employed, other releasable conventional fasteners equally be used.

Thus, while only several embodiments of the present invention have been shown and described, it is obvious that many changes and modification may be made thereunto without departing from the spirit and scope of the invention.

What is claimed is:

1. A combination seat cushion and life vest particularly adapted for use in an aircraft chair comprising:
a generally rectangular buoyant main rear panel and a buoyant segmented front panel hingedly joined to said rear panel in substantially covering relationship thereto so as to form, in a closed position thereof, a generally rectangular cushion of generally uniform thickness and, in an open position thereof, an openable and wearable life vest sized and dimensioned to cover the rear side and front side of a user from the shoulder to approximately the waist, said front and rear panels each having a top edge, a bottom edge and a pair of lateral side edges, said segmented front panel including a neck cutout slit centrally disposed along and adjacent to said top edge thereof forming a neck flap hingedly joined along a hinge line to said top edge of said rear panel, and a bifurcating vertical slit extending between said bottom edge thereof and terminating at said neck cutout slit so as to divide said segmented front panel into an openable front left flap and an openable front right flap, each flap being hingedly joined along said hinge line to said rear panel, and said front left and right flaps each including an arm cutout slit disposed along a corresponding side lateral edge thereof forming an arm cutout flap hingedly joined to a corresponding side lateral edge of said main rear panel; and means for releasably securing said openable left and right flaps in a closed relationship.

2. The combination seat cushion and life vest according to claim 1, wherein said main rear panel and said segmented front panel further include an outer covering shell.

3. The combination seat cushion and life vest according to claim 1, wherein said releasably securing means includes hook and loop fastening elements.

4. The combination seat cushion and life vest according to claim 1, additionally including means for connecting said front left flap and Said front right flap to said main rear panel along a corresponding lateral side edge of said main rear panel.

5. The combination seat cushion and life vest according to claim 4, wherein said connecting means are a pair of retaining straps.

6. The combination seat cushion and life vest according to claim 4, wherein said connecting means includes frangible connections between said front left flap and said front right flap and said corresponding lateral side edge of said main rear panel.

7. The combination seat cushion and life vest according to claim 4, wherein said connecting means includes a releasably adhesively bonded and folded web interconnecting the lateral side edges of said front and rear panels which in a folded and bonded condition maintains said front and rear panels in abutting relationship and in an unfolded condition allows said panels to be spread apart a fixed distance.

8. The combination seat cushion and life vest according to claim 1, wherein said front left and right flaps and said upper arm cutout flaps are formed in corners of said front panel defined between said top and side lateral edges thereof.

9. The combination seat cushion and life vest according to claim 8, wherein said front left and right flaps are segmented along vertical hinge lines.

10. The combination seat cushion and life vest according to claim 1, wherein said rear panel has a generally centrally disposed horizontal hinge line to define an upper main panel and a lower main panel and additionally includes a pair of releasably restraining straps coupling said lower main panel and said front panel, one of which is intended to fit around the waist of the wearer and the other of which is intended to fit between the legs of the wearer.

* * * * *